United States Patent [19]

Tsuneyoshi et al.

[11] Patent Number: 5,557,718
[45] Date of Patent: Sep. 17, 1996

[54] INFORMATION PROCESSING APPARATUS HAVING A FUNCTION OF DISPLAYING A PLURALITY OF GRAPHS

[75] Inventors: Katsumasa Tsuneyoshi, Higashiosaka; Akiyoshi Satoh, Nara, both of Japan

[73] Assignee: Sharp Kabushiki Kaisha, Osaka, Japan

[21] Appl. No.: 447,441

[22] Filed: May 23, 1995

[30] Foreign Application Priority Data

Jun. 8, 1994 [JP] Japan ..................... 6-126574

[51] Int. Cl.$^6$ .......................... G06F 15/00
[52] U.S. Cl. .......................... 395/140
[58] Field of Search .......................... 395/140, 142; 345/133, 134; 364/718, 719, 720, 721, 722

[56] References Cited

U.S. PATENT DOCUMENTS

| | | | |
|---|---|---|---|
| 4,809,189 | 2/1989 | Batson | 395/140 |
| 5,371,842 | 12/1994 | Easton et al. | 395/140 |
| 5,485,564 | 1/1996 | Miura | 395/140 |

FOREIGN PATENT DOCUMENTS 61-256380 of 1986 Japan.
4-306696 of 1992 Japan.
5-250484 of 1993 Japan.

*Primary Examiner*—Phu K. Nguyen
*Attorney, Agent, or Firm*—Nixon & Vanderhye P.C.

[57] ABSTRACT

In the information processing apparatus having a function of displaying a plurality of graphs, when information on mathematical expressions for drawing a plurality of graphs and information on scales on a plurality of axes associated with the graphs is input from an input portion, a drawing data conversion portion converts the information on a plurality of expressions into graph drawing data for drawing a plurality of graphs and converts the information on scales on a plurality of axes into axes drawing data to be used for graduating axes for respective graphs. A graph drawing portion draws a plurality of graphs such that they overlap each other about a common axis based on the graph drawing data and axes drawing data obtained as a result of the conversion and draws axes having different scales for respective graphs on the same screen of a display portion. An arrangement may be provided to draw a trace pointer on a graph to be traced and an axis pointer on the axis for the graph when the graph to be traced is specified. This makes it possible to clearly display transitions of values on a graph from among graphs having different ranges displayed on the same screen for clear readability.

6 Claims, 10 Drawing Sheets

PRIOR ART
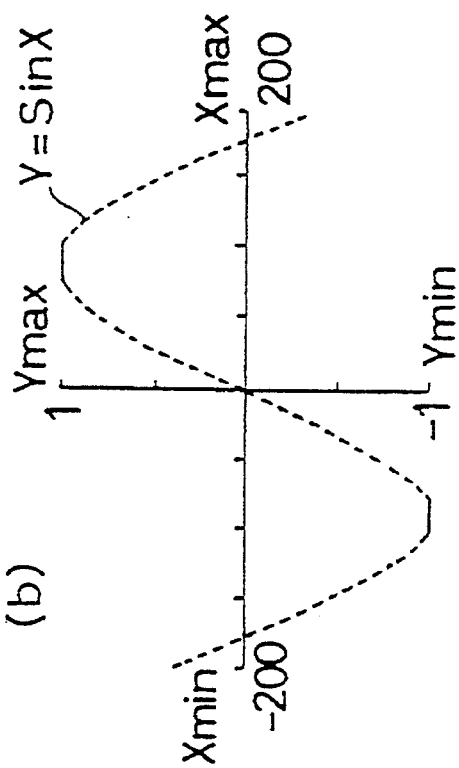
FIG.10 (b)
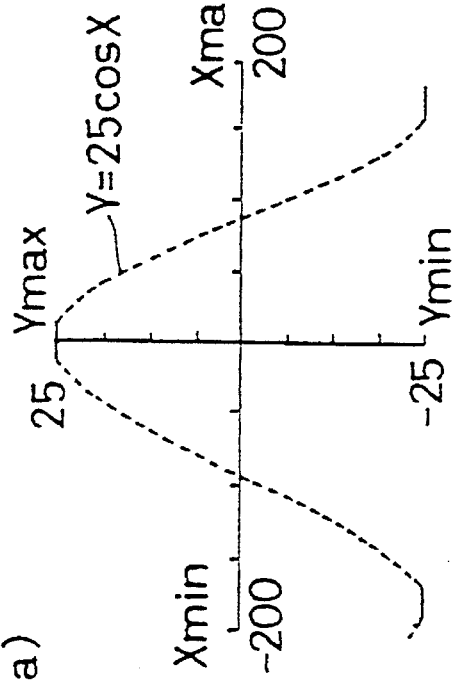
FIG.10 (a)
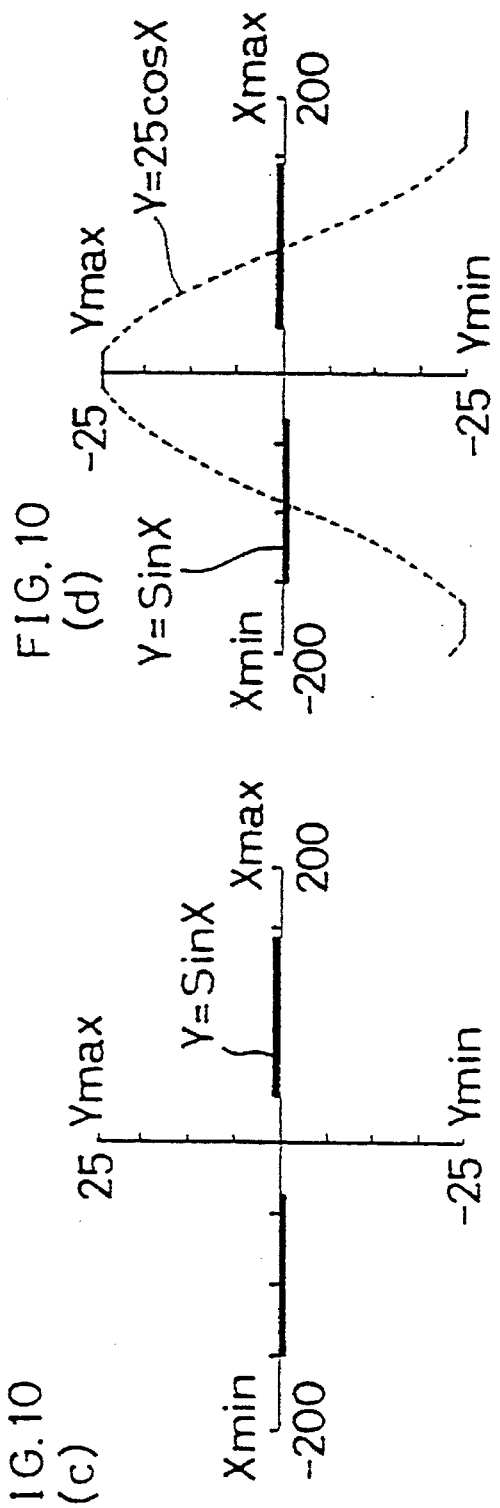
FIG.10 (d)
FIG.10 (c)

INFORMATION PROCESSING APPARATUS HAVING A FUNCTION OF DISPLAYING A PLURALITY OF GRAPHS

BACKGROUND OF THE INVENTION

1. Field of the Invention

The present invention relates to an information processing apparatus having a function of displaying a plurality of graphs and, more particularly, to an information processing apparatus having a function of displaying a plurality of graphs wherein a plurality of graphs are drawn one over the other on the same screen such as scientific electronic calculators, electronic notebooks, personal computers, and word processors.

2. Description of the Related Art

In this type of information processing apparatuses, to display two graphs representing different functions on one screen, the horizontal and vertical axes have been graduated in association with the two function graphs and have been shared by the graphs.

FIG. 10 illustrates an example of the display of graphs on a conventional information processing apparatus having a function of displaying a plurality of graphs. An example of full-span display of a function "Y =25cosX" on a graphic screen is shown at (a) in FIG. 10 where the maximum value Ymax and minimum value Ymin of the vertical axis are set to 25 and −25, respectively, and the maximum value Xmax and minimum value Xmin of the horizontal axis are set to 200 and −200, respectively.

An example of full-span display of a function "Y=sinX" on the graphic screen is shown at (b) in FIG. 10 where the maximum value Ymax and minimum value Ymin of the vertical axis are set to 1 and −1, respectively, and the maximum value Xmax and minimum value Xmin of the horizontal axis are set to 200 and −200, respectively.

An example of display of the function "Y=sinX" at (b) in FIG. 10 on the graphic screen is shown at (c) in FIG. 10 where the vertical axis is set to the same scale as that of the vertical axis shown at (a) in FIG. 10 (Ymax=25, Ymin=−25).

An example of overlapped display of the function "Y=25cosX" at (a) in FIG. 10 and the function "Y=sinX" at (c) in FIG. 10 on the graphic screen is shown at (d) in FIG. 10 where the vertical axis is set to the same scale as that of the vertical axis shown at (a) in FIG. 10 (Ymax=25, Ymin=−25). In this case, the graph of the function "Y=sinX" shrinks and becomes very unclear.

As apparent from the example of display of a graph shown at (d) in FIG. 10, when graphs having greatly different display ranges are drawn to the same scale, one of the graphs shrinks. For example, this makes it impossible to know the shape of the graph which has shrunk even if the trace pointer (trace mark) is moved to trace the graph, which has resulted in a problem in that the comparison of those graphs becomes very difficult.

Although tracing functions are available in the prior art and are substantially similar to each other, there has been a problem associated with the comparison of graphs because, for example, no function has been available to change the scale of the vertical axis in association with a plurality of graphs.

As another example of the prior art, there has been proposed a graph creating device for generating a Pareto diagram from a plurality of common data to be graphed wherein a plurality of bar graphs (items) having predetermined widths are drawn along one of the axes of a polygonal line graph and wherein the polygonal line graph is synthesized with the plurality of bar graphs by overlapping them with the positional relationship between the polygonal line graph and the widths of the bar graphs varied arbitrarily (see Japanese Unexamined Patent Publication HEI 5(1993)-250484).

As another example of the prior art, there has been proposed a process monitoring apparatus for displaying a plurality of trend graphs on the same screen at a time wherein the scale is appropriately graduated from the upper and lower limits of process values; scales and scale values are assigned with the length of the scale axes adjusted to in relation to the upper and lower limits of the process value; and the horizontal axis is displayed in the trend display range inside the upper and lower limits of the scale (see Japanese Unexamined Patent Publication HEI 4(1992)-306696).

As still another example of the prior art, there has been proposed a compact electronic calculator having a function of displaying graphs wherein, when data for displaying a graph is provided in such a manner that it overlaps data for displaying a graph preset in a display storage means, the former is overwritten without clearing the latter to display the plurality of graphs in an overlapping relationship (see Japanese Unexamined Patent Publication SHO 61(1986)-256380).

According to Japanese Unexamined Patent Publication HEI 5(1993)-250484, a Pareto diagram is created by changing the positional relationship between a polygonal line graph and bar graphs arbitrarily to improve the clarity of the correspondence between the points of transition on the polygonal line graph and the bar graphs. However, there is no means for finding the correspondence between the scales on the axes and the polygonal line graph. Therefore, to determine the characteristics of a Pareto graph, it is necessary to visually trace the polygonal line graph and the bar graphs of interest from the scale for the determination of the characteristics of the Pareto diagram. This has limited the readability of such a Pareto diagram.

According to Japanese Unexamined Patent Publication 4(1992)-306696, a process monitoring apparatus is improved in that the determination of upper and lower limits of the process value becomes easy because a plurality of trend graphs can be displayed on The same screen at a time with the positions of graduations on the scale axes thereof adjusted for each of the trend graphs. However, no representation means is provided to identify correspondence between the trend graphs and scale axes. Therefore, readability is not approved when the value of a transition on one particular trend graph is to be read.

Further, according to Japanese Unexamined Patent Publication SHO 61(1986)-256380, it is possible to simultaneously display a plurality of graphs on the same screen one over the other without clearing graph displaying data which has been preset in a display storage means. Although this simplifies procedures for inputting graphs, there is no provision for display of graphs along two types of axes having different scales that depend on the graphs. For example, this results in a problem associated with the display of two mathematical expressions in that, when graphs having ranges greatly different from each other are drawn using the same scale, one of the graphs is compressed or expanded beyond the full scale Assume that a plurality of graphs spanning different ranges are displayed about the X axis serving as a common axis with a plurality of scales provided along the Y-axis.

As described above, there is no representation means for identifying the correspondence between the graphs and the scales according to the prior art. This has resulted in a problem in that, when the shape or the value of a transition in a particular graph is to be read, a wrong scale may be used and the value of a transition may be difficult to read.

SUMMARY OF THE INVENTION

It is an object of the present invention to provide an information processing apparatus having a function of displaying a plurality of graphs wherein it is possible to easily identify the scale to be used for reading the shape of and a change in a particular one of a plurality of graphs having different display ranges displayed on the same screen.

According to the present invention, there is provided an information processing apparatus having a function of displaying a plurality of graphs including display means for displaying graphs and the like, input means for at least inputting information such as information on mathematical expressions needed for drawing a plurality of graphs and information on graduation of a plurality of axes for respective graphs, drawing data conversion means for converting the input information on a plurality of mathematical expressions into graph drawing data for drawing a plurality of graphs and for converting the information on graduation of a plurality of axes into axes drawing data to be used for graduating axes for respective graphs, graph drawing means for drawing a plurality of graphs such that they overlap each other about a common axis based on the graph drawing data and axes drawing data obtained as a result of the conversion and for drawing axes having different scales for respective graphs on the same screen, and pointing means for inputting pointing information to point a desired graph from among the plurality of graphs drawn on the same screen and to trace the graph, the graph drawing means drawing a trace pointer on the relevant graph and drawing an axis pointer on the axis corresponding to the relevant graph in response to the pointing information received from the pointing means.

The present invention makes it possible to draw graphs having different ranges on the same screen one over the other with different scales applied to them. Further, there is provided a means for making additional representation on the scales for the respective graphs. It is therefore possible to perform display by effectively utilizing a limited screen and to easily compare the shades of a plurality of graphs.

BRIEF DESCRIPTION OF THE DRAWINGS

The present invention will be detailed in conjunction with the accompanying drawings.

FIG. 10*a*–10*d* illustrates an example of the display of graphs in a conventional information processing apparatus having a function of displaying a plurality of graphs.

DESCRIPTION OF THE PREFERRED EMBODIMENTS

Figure 1:
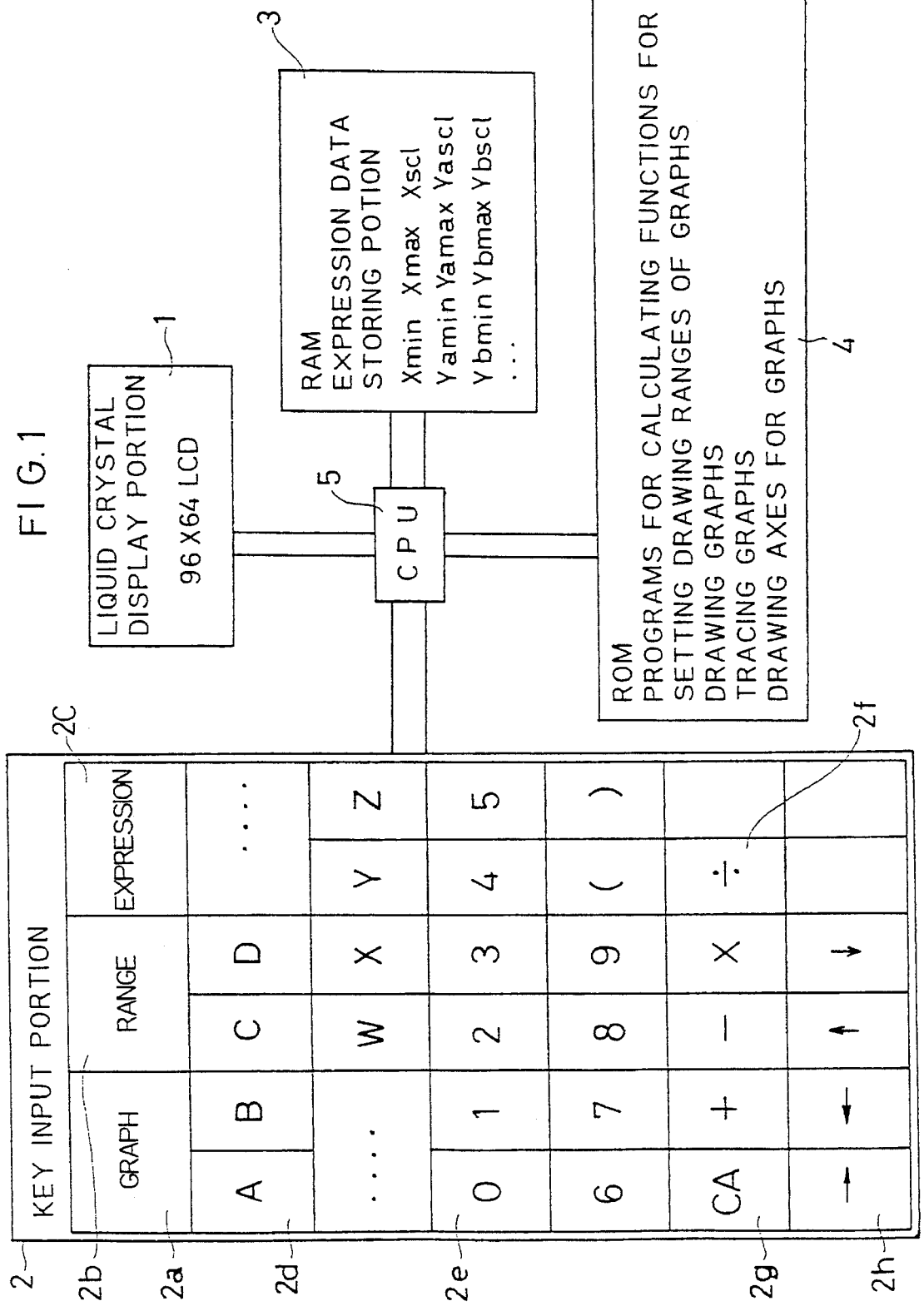
FIG. 1 is a block diagram of an embodiment which is an application of the present invention to a graphic scientific electronic calculator.

The present invention will now be described in detail with reference to the illustrated preferred embodiments thereof. The present invention is not limited to those embodiments. The present invention is suitable particularly to information processing apparatuses having a graphic display function such as scientific electronic calculators, electronic notebooks, personal computers, and word processors. The apparatuses of the present invention provide a function of operating functions in addition to a function of drawing a plurality of graphs one over the other on the same screen according to the present invention.

The display means for displaying graphs according to the present invention is preferably constituted by a display device such as an LCD (liquid crystal display) device having a dot matrix screen, a CRT display device, and an EL display device.

It is preferable to use an input device such as a keyboard, a mouse, and a pen tablet, as the input means for inputting information such as information on mathematical expressions needed for drawing a plurality of graphs and information on graduation of a plurality of axes for respective graphs and the pointing means for inputting pointing information (a mark etc.) to point a desired graph from among the plurality of graphs drawn on the same screen and to trace the graph.

It is preferable to use a microcomputer constituted by a CPU, a ROM, a RAM, and an I/O port, as the drawing data conversion means for converting the input information on a plurality of mathematical expressions into graph drawing data for drawing a plurality of graphs and for converting the information on graduation of a plurality of axes into axes drawing data to be used for graduating axes for respective graphs and the graph drawing means for drawing a plurality of graphs such that they overlap each other about a common axis based on the graph drawing data and axes drawing data obtained as a result of the conversion and for drawing axes having different graduations for respective graphs on the same screen.

The above-described RAM has an area for storing the data of mathematical expressions for graphs, an area for storing arithmetic data obtained from the data of mathematical expressions, an area for storing drawing data obtained by converting the arithmetic data, and the like.

The above-described ROM has an area for storing mathematical expressions for drawing graphs, programs for functions such as inputting graphs, drawing graphs, tracing graphs, and drawing axes of graphs, and fixed data, an area for storing symbols or marks displayed as an axis pointer indicating a graduation on an axis and a trace pointer indicating coordinates on a graph, and the like.

FIG. 1 is a block diagram of an embodiment which is an application of the present invention to a graphic scientific electronic calculator.

In FIG. 1, 1 designates a liquid crystal display portion which is a graphic display device having a graphic screen constituted by a liquid crystal matrix of 96 (horizontal) dots 64 (vertical) dots.

2 designates a key input portion having a graph drawing key 2a, a drawing range key 2b, an expression input key 2c, alphabet keys 2d ("A" to "Z"), numerical keys 2e ("0" to "9"), calculation keys 2f ("(",")", "+", "−", "×", "÷", and "="), a clear key 2g, and cursor keys 2h ("→", "←", "↑", and "↓").

The graph drawing key 2a is a key for drawing a graph based on an expression and a range set on the display screen.

The drawing range key 2b is a key for allowing a switchover to a range mode in which a display range for a graph to be drawn on the display screen is set.

The expression input key 2c is a key for allowing a switchover to an expression mode in which a mathematical expression for a graph to be drawn on the display screen is set.

The alphabet keys 2d are keys for inputting functions and variables when an expression is input.

The numerical keys 2e are keys for inputting numerical values when an expression is input or when a drawing range is set.

The calculation keys 2f are keys for inputting symbols of calculation when basic calculations are input in order to input an expression.

The clear key 2g is a key for clearing the contents of an expression or drawing range which have been input.

The keys with arrows pointing to the left and right among the cursor keys 2h are keys for calling and moving a pointer for a tracing function to indicate a graph which has been drawn with the coordinates of the points through which the graph passes. The keys with arrows pointing upward and downward among the cursor keys 2h are keys for moving a pointer between a plurality of graphs drawn according to different expressions during tracing.

The data input from the key input portion 2 is set in a storage portion (RAM) through a control portion (CPU) to be described later.

3 designates a RAM which is constituted by memory areas serving as an expression data storing portion 3a for storing the data of expressions for drawing graphs, a calculation buffer 3b for calculations needed to draw graphs based on the data of expressions, and a graph data storing portion 3c for storing drawing data for performing drawing on a screen according to the calculation data.

The expression data storing portion 3a includes registers such as Xmax, Xmin, and Xscl registers for storing the display range and scale on the X-coordinate axis for all of the expressions and Ymin1, Ymax1, Yscl1, Ymin2, Ymax2, and Yscl2 registers for storing the display range and scale on the Y-coordinate axis for all of the expressions 4 designates a ROM for storing expressions for drawing graphs, programs for functions such as inputting graphs, drawing of graphs, tracing graphs, and drawing axes of graphs, and fixed data.

5 designates a CPU (control portion) for controlling members that constitute the apparatus in accordance with a program. In the present embodiment, the CPU 5 functions as a drawing data conversion means for setting the display ranges of graphs according to instructions received from the key input portion 1 and for converting the graphs representing the expressions stored in the RAM 3 based on the calculation formula for drawing graphs stored in the ROM 4. The CPU 5 also functions as a graph drawing means for drawing the converted drawing data on a graphic screen.

A graph can be drawn by pushing the graph drawing key 2a after registering the expression to be graphed (e.g. functional expression, n-dimensional expression) and setting the display range. Description is omitted for key input operations associated with the registration of the expression, the setting of the display range, and the drawing of the graph because they are the same as those in the prior art.

Figure 2:
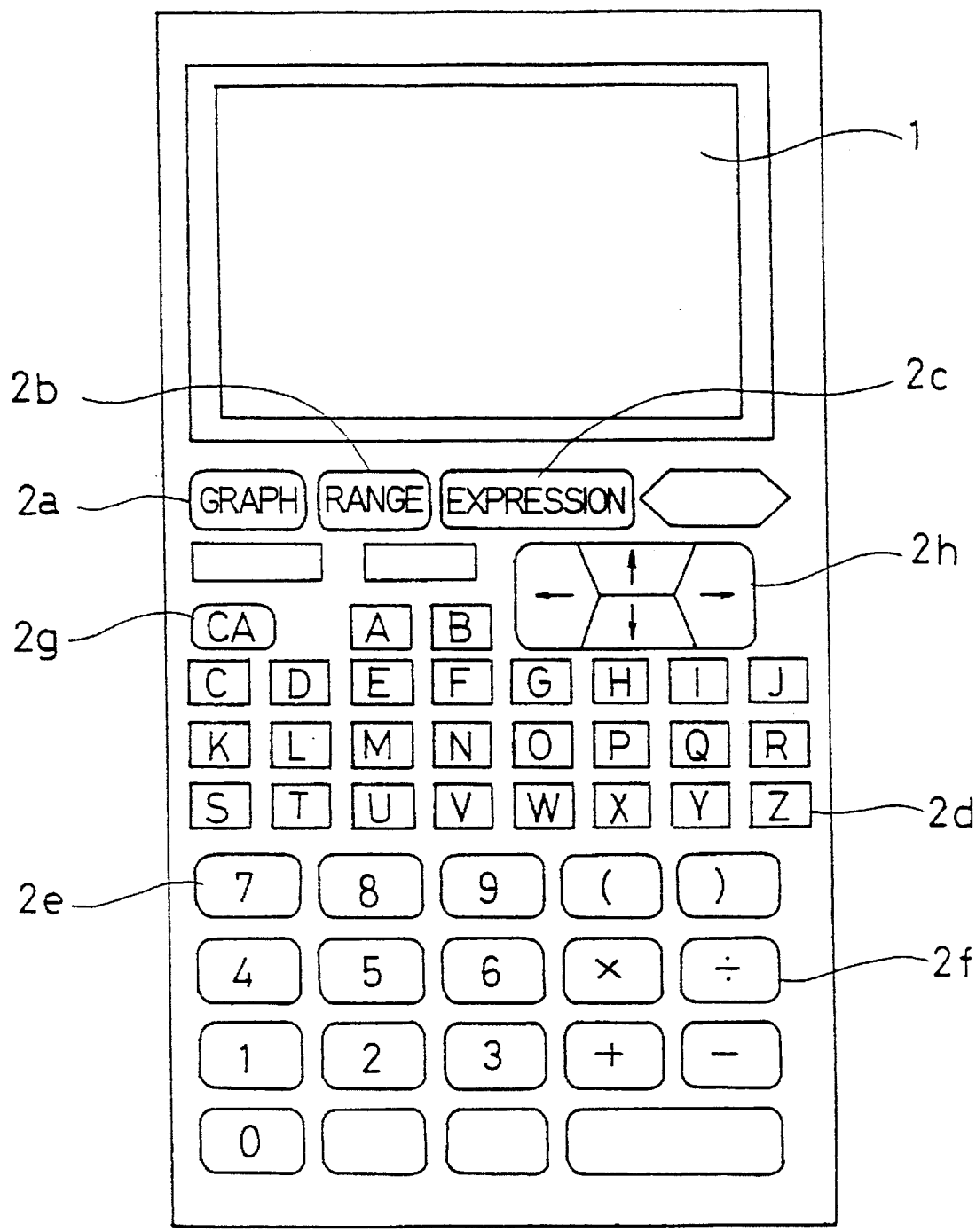
FIG. 2 illustrates the appearance of a display/ operation panel of a graphic scientific electronic calculator according to the present invention.

FIG. 2 illustrates the appearance of a display/ operation panel of a graphic scientific electronic calculator according to the present invention. As shown in FIG. 2, the display/ operation panel has the liquid crystal display portion 1 at the upper portion thereof and the key input portion 2 at the lower portion thereof and incorporates the CPU 5 for calculation, the RAM 3 for storing data such as numerical values, graphs, and flags, and the ROM 4 in which programs and fixed data are stored in advance, and the like.

Figure 3:
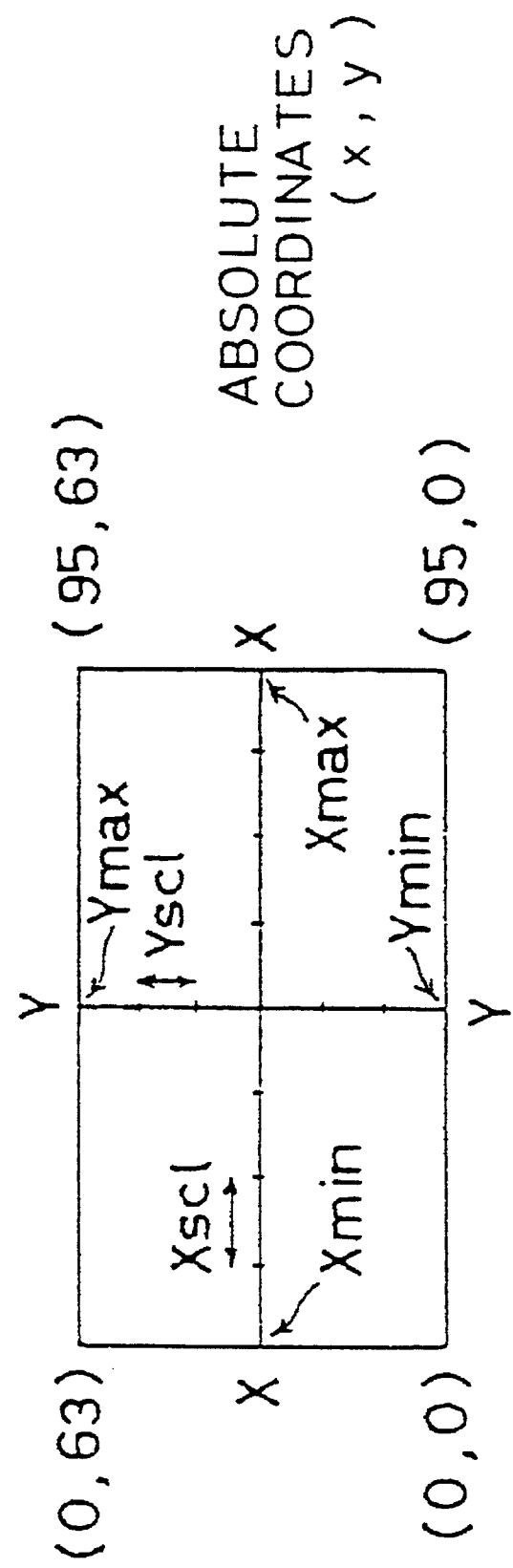
FIG. 3 illustrates the relationship between absolute coordinates and graphic axes on a graphic screen to the present invention.

FIG. 3 illustrates the relationship between absolute coordinates and graphic axes on a graphic screen. As shown in FIG. 3, absolute coordinates (x, Y) up to coordinates (95, 63) are assigned to the graphic screen having 64 (vertical) dots X 96 (horizontal) dots on a dot-by-dot basis starting with the dot at the bottom left-hand corner as the origin (0, 0). A graph is drawn by correlating the absolute coordinates (x, y) with the actual values (X, Y) of the expression. In FIG. 3, Xmax represents the maximum value on the X-axis; Xmin represents the minimum value on the X-axis; Xscl represents an interval of a scale on the X-axis; Ymax represents the maximum value on the Y-axis; Ymin represents the minimum value on the Y-axis; and Yscl represents an interval of a scale on the Y-axis.

Figure 4:
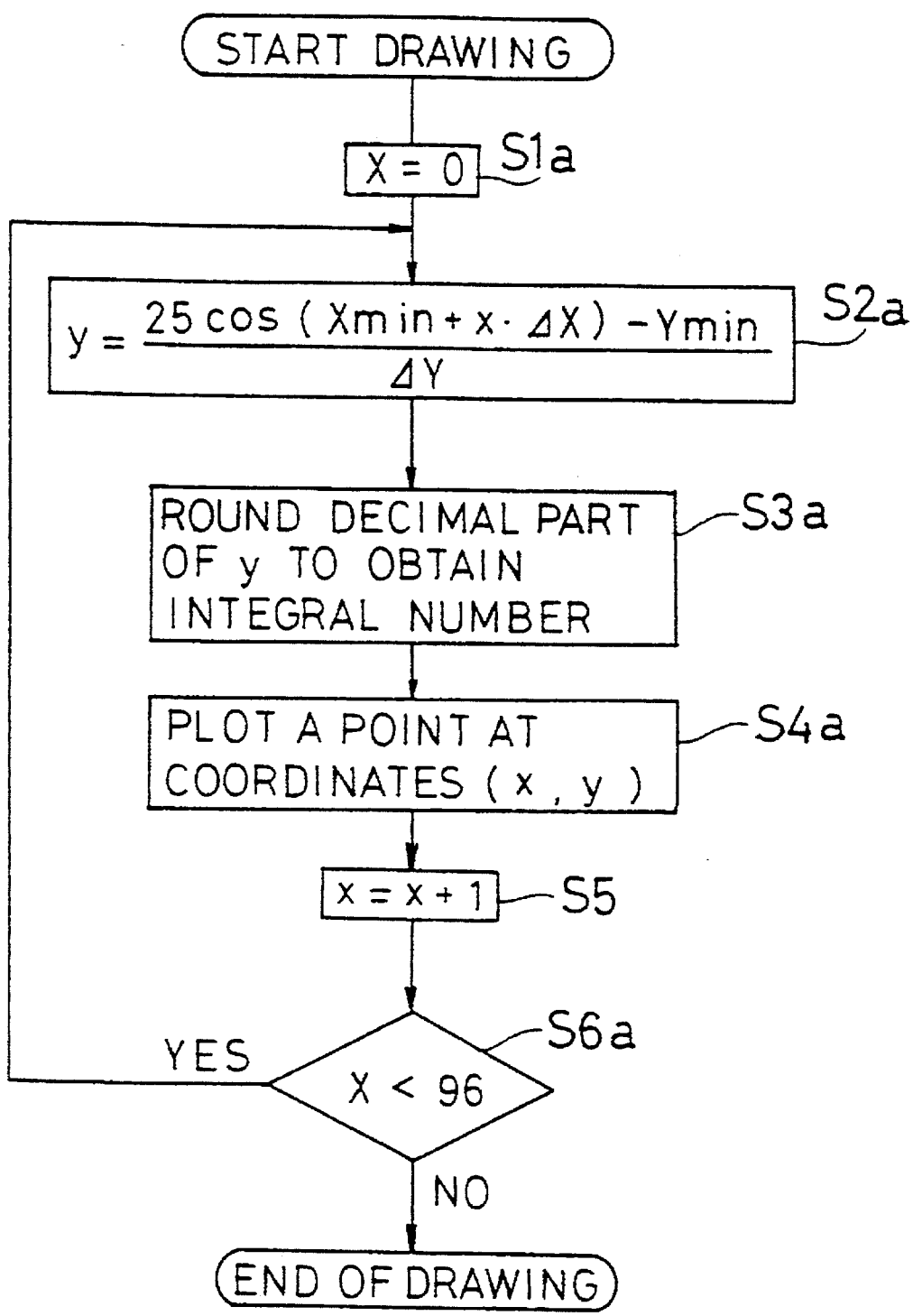
FIG. 4 is a flow chart showing the steps of calculation for drawing a graph representing a function to the present invention.

FIG. 4 is a flow chart showing the steps of calculation for drawing a graph representing a function. FIG. 4 is made based on the following assumptions;

Expression "a": $Ya=25\cos X$ (X is in degrees)

Expression "b": $Yb=\sin X$

| | |
|---|---|
| display range on the X-axis: | Xmin = −200 |
| | Xmax = 200 |
| | Xscl = 50 |
| display range on the Y-axis for Expression "a": | Yamin = −25 |
| | Yamax = 25 |
| | Yascl = 6.5 |
| display range on the Y-axis for Expression "b": | Ybmin = −1 |
| | Ybmax = 1 |
| | Ybscl = 0.5 |

An algorithm for drawing a graph associated with Expression "a" ($Ya=25\cos X$) will be described with reference to the steps of calculation for the same expression.

The graph is drawn by increasing each of the values of absolute coordinates from x=0 to x=95 by $\Delta X=(Xmax-Xmin)/95$ and by plotting points (x, y) on the absolute coordinate system calculated from the values Y obtained by Expression "a" with increased values of X. The steps of this calculation are as follows.

At step S1a, x is set to 0

At step S2a, the value of y is calculated.

$y=(25\cos(x\cdot\Delta X+Xmin)-Yamin)/\Delta Y$ is obtained from $X=x\cdot\Delta X+Xmin$ ($\Delta X=(Xmax-Xmin)/95$);

$Y=y\cdot\Delta Y+Yamin$ ($\Delta Y=(Yamax-Yamin)/63$); $Y=25\cos X$; and y $=(Y-Yamin)/\Delta Y$.

If −200, 200, −25, 25, and 0 are substituted for Xmin, Xmax, Yamin, Yamix, and x, respectively, y=1.899 . . . is obtained.

At step S3a, the decimal part is rounded to obtain y as an integral number. Specifically, y=2 is obtained.

At step S4a, a point is plotted at absolute coordinates (0, 2).

At step S5a, x is incremented (x=x+1) to obtain x=1.

At step S6a, it is determined whether x is smaller than 96. In this case, the process returns to step S2a because x is smaller than 96 to repeat steps S2a through S5a. These steps are repeated until x equals 95 to draw the graph.

A graph for Expression "b" (Yb=sinX) is drawn by repeating the steps S2a through S5a similarly with the expression at step S2a replaced by the expression "Yb=sinX".

Figure 5:
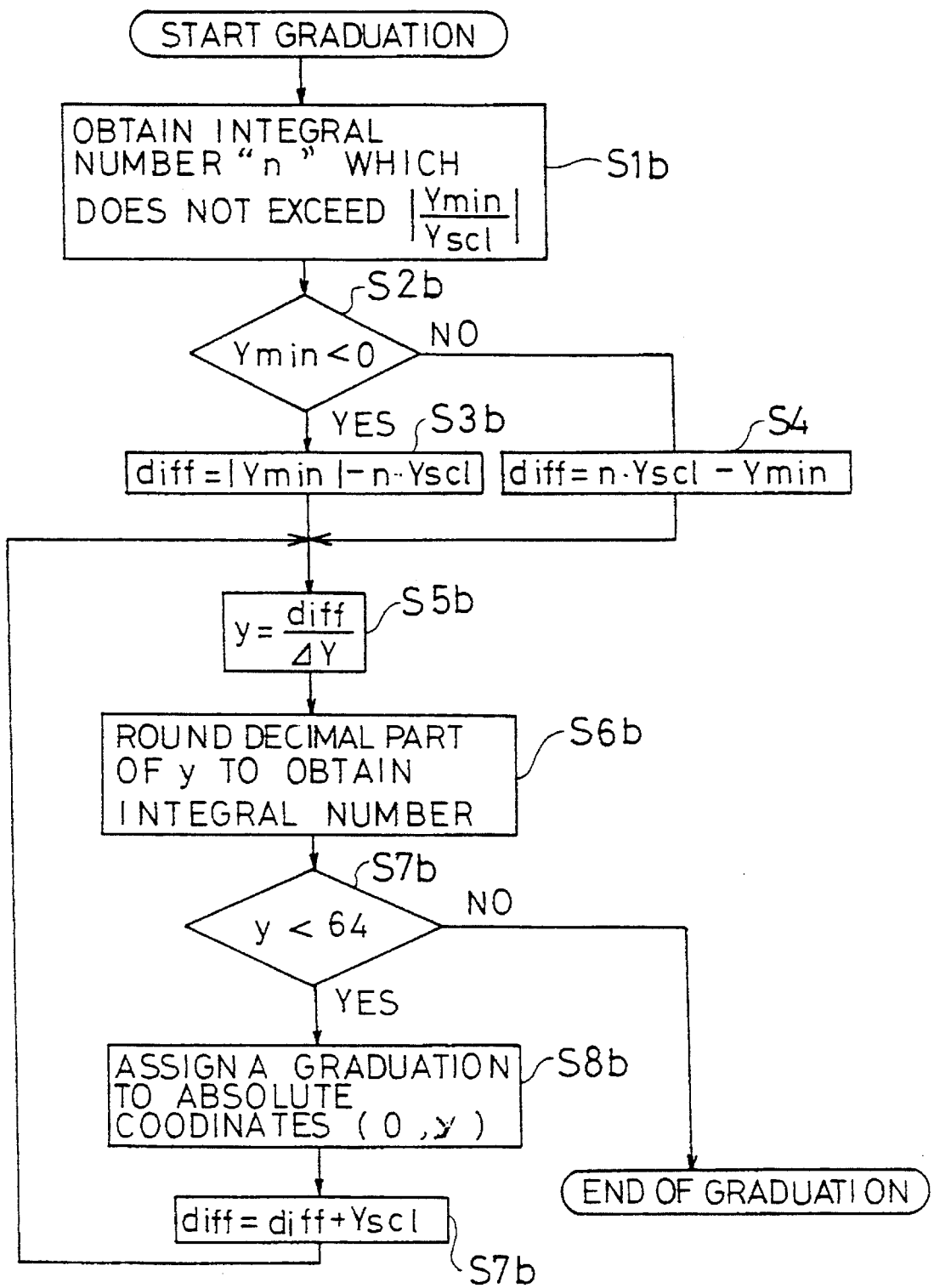
FIG. 5 is a flow chart showing the steps of calculation for drawing a scale on a graphic axis to the present invention.

FIG. 5 is a flow chart showing the steps of calculation for drawing a scale on a graphic axis. Referring to FIG. 5, an algorithm for assigning a scale on an axis for a graph for Expression "a" will be described.

At step S1b, an integral number n is obtained which does not exceed |Yamin/Yascl|.

Since Yamin=−25 and Yascl=6.5, |Yamin/Yascl|=3.846 . . . is obtained. Thus, n=3 is obtained.

At step S2b, it is determined whether the set value (range) of Yamin is positive or negative.

If the set value of Yamin is negative, the process proceeds to step S3b to make a calculation: diff=|Yamin|−n·Yascl. If the set value of Yamin is positive, the process proceeds to step S4b to make a calculation: diff =n·Yascl−Yamin.

"diff" is a variable which is increased from Yamin by increments which are equal to the intervals of the scale. The graduation which comes first after Yamin is not necessarily equal to other intervals.

At step S3b, the value of the variable "diff" is calculated where Yamin=−25; Yascl=6.5; and n=3. This gives:

$$diff=|-25|-3\times 6.5=5.5$$

At step S5b, the scale for y is calculated. Since y=diff/$\Delta Y$ and $\Delta Y$=(Yamax−Yamin)/63 =0.7936 . . . , y is obtained as follows.

$$y=diff/\Delta Y=6.93$$

At step S6b, y is rounded into an integral number (y=7).

At step S7b, it is determined whether y is smaller than 64.

At step S8b, a graduation is assigned to absolute coordinates (0, 7).

At step S9b, the value of "diff" is updated (diff=diff +Yascl). This gives diff=12. The process returns to step S5b to repeat steps S5b through S9b until y≧64 is satisfied. Thus, graduations are assigned to the axis. This process is terminated when y reaches 64.

Graduations can be assigned to an axis for a graph of Expression "b" in accordance with an algorithm wherein the value of n is obtained at step S1b; the value of "diff" is obtained at step S3b; and the processes at steps S5b through S9b are similarly repeated.

When the two axes are drawn, the axis for the graph of Expression "a" may be positioned at the left end (x=0) of the graphic screen and the axis for the graph of Expression "b" may be positioned at the right end (x=95) of the graphic screen.

Figure 6:
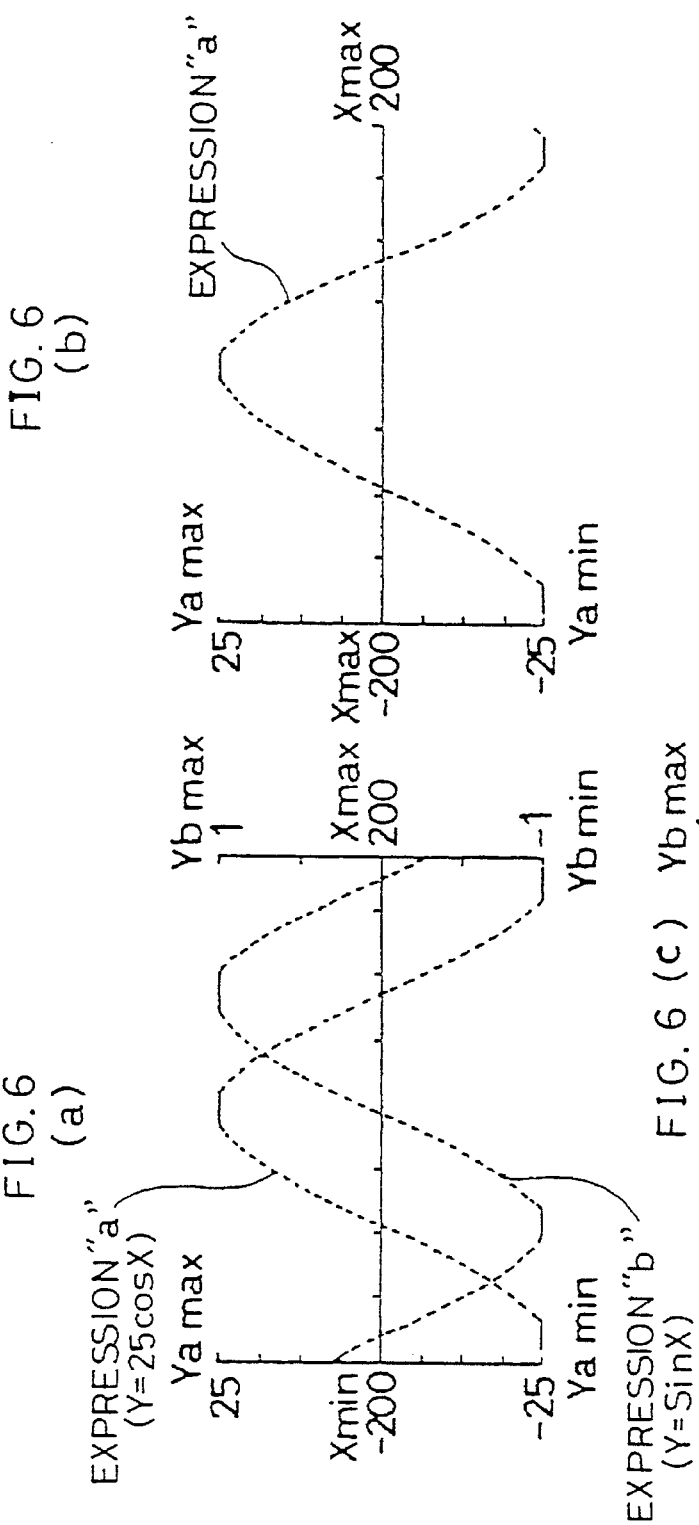
FIG. 6A–6C illustrates an example of overlapped display of a plurality of graphs according to the present invention.

FIG. 6 illustrates an example of overlapped display of a plurality of graphs according to the present invention. As shown at (a) in FIG. 6, graphs of the following expressions are drawn on a graphic screen in the form of a matrix of 96×64, with Y-axes drawn for respective graphs. Expression "a": Ya=25cosX (X is in degrees) Expression "b": Yb=sinX The graphs are drawn with the setting as shown below.

| display range on the X-axis: | Xmin = −200 |
| --- | --- |
| | Xmax = 200 |
| | Xscl = 50 |
| display range on the Y-axis for Expression "a": | Yamin = −25 |
| | Yamax = 25 |
| | Yascl = 6.5 |
| display range on the Y-axis for Expression "b": | Ybmin = −1 |
| | Ybmax = 1 |
| | Ybscl = 0.5 |

The Y-axis shown at (b) in FIG. 6 corresponds to that of the graph of expression "a" before the drawing on an overlap basis, whereas the Y-axis shown at (c) in FIG. 6 corresponds to that of the graph of expression "b" before the drawing on an overlap basis.

Figure 7:
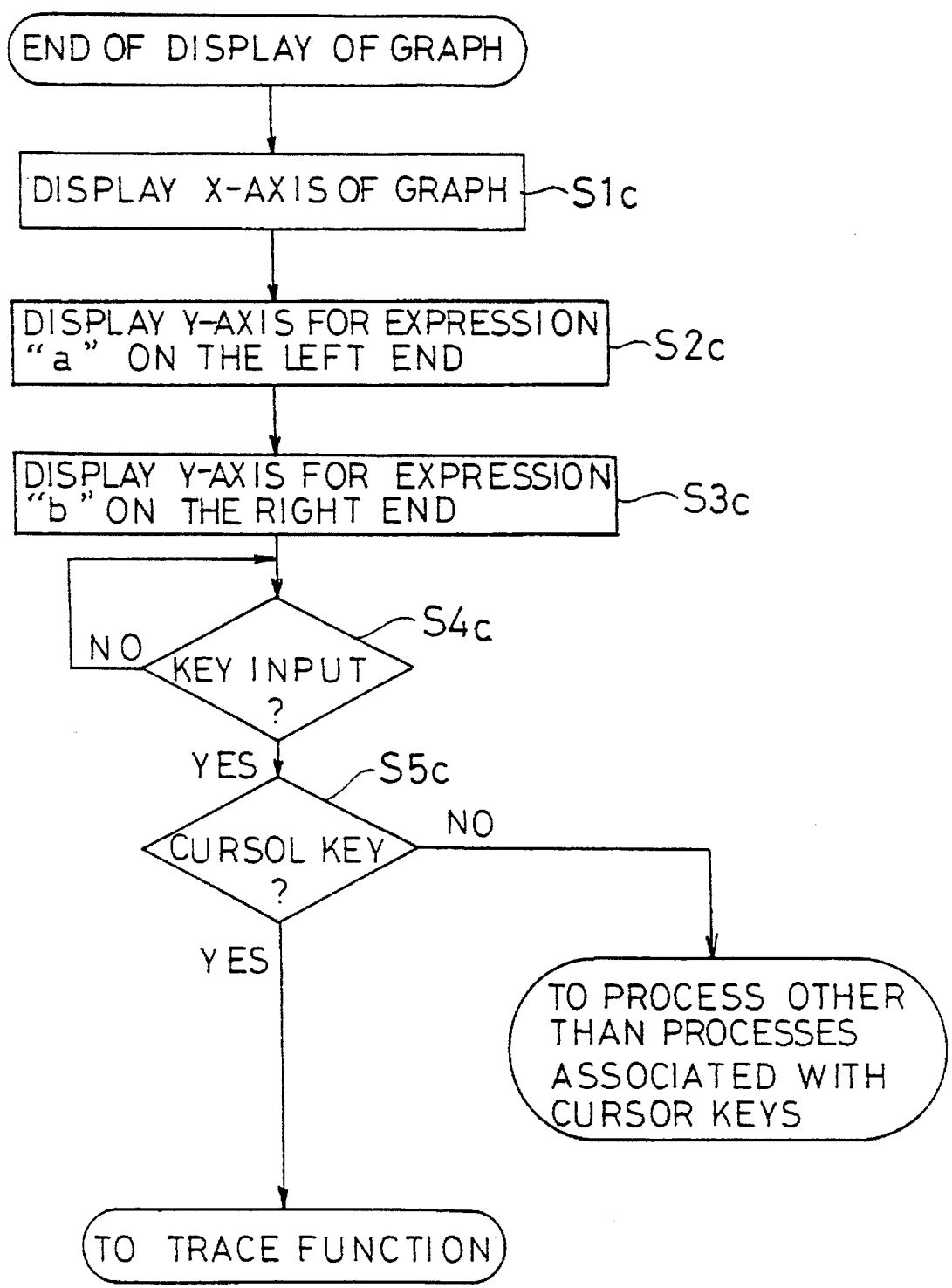
FIG. 7 is a flow chart showing steps of setting a scale of an axis after the drawing of a graph to the present invention.

FIG. 7 is a flow chart showing steps of setting graduations of an axis after the drawing of a graph.

At step S1c, the X-axis which is common to the two expressions is drawn after the graphs are drawn. A screen for setting the X-axis is displayed, and the following values are set.

Xmin=−200

Xmax=200

Xscl=50

Then, values of x are sequentially calculated using calculation formulas as shown below (see FIG. 5). The X-axis is graduated according to the same algorithm as used for the Y-axes.

$$x=diff/\Delta X, \Delta X=(Xmax-Xmin)/95=4.210 \ldots$$

Absolute coordinates (0, 32), (12, 32), (24, 32), etc. are obtained as graduations on the X-axis and are sequentially plotted on the X-axis.

At step S2c, a screen for setting a Y-axis is displayed, and the following values are set.

Yamin=−25

Yamax=25

Yascl=6.5

Then, values of y are sequentially calculated using calculation formulas as shown below (see FIG. 5).

$$y=diff/\Delta Y, \Delta Y=(Ymax-Ymin)/63=0.7936 \ldots$$

Absolute coordinates (0, 7), (0, 15), (0, 23), etc. are obtained as graduations on the Y-axis for Expression "a" and are sequentially plotted on the Y-axis for Expression "a". The Y-axis for Expression "a" is displayed on the left end of the screen.

At step S3c, the following values are set for setting the Y-axis for Expression "b".

Ybmin=−1

Ybmax=1

Ybscl=0.5

Then, values of y are sequentially calculated using calculation formulas as shown below (see FIG. 5).

$$y=diff/\Delta Y, \Delta Y=(Ymax-Ymin)/63=0.03174 \ldots$$

Absolute coordinates (95, 0), (95, 16), (95, 32), etc. are obtained as graduations on the Y-axis for Expression "b" and are sequentially plotted on the Y-axis for Expression "b". The Y-axis for Expression "b" is displayed on the left end of the screen.

At step S4c, the process enters a standby state wherein it waits for a key input (see (a) in FIG. 6).

At step S5c, a tracing function is activated upon the input of a cursor key.

Figure 8:
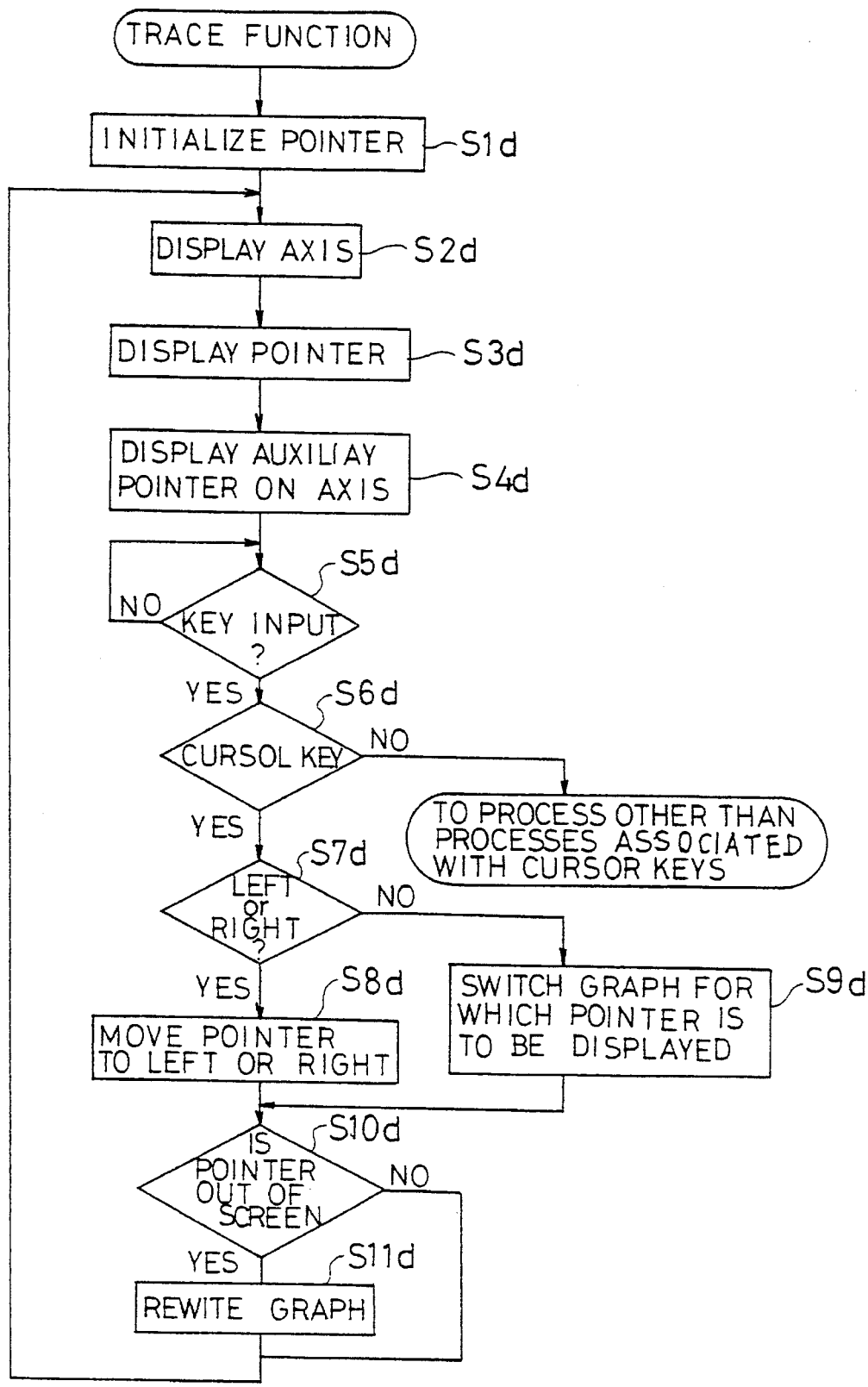
FIG. 8 is a flow chart showing the steps of display an axis and operating a pointer during a tracing process according to the present invention.

FIG. 8 is a flow chart showing the steps of display an axis and operating a pointer during a tracing process according to the present invention. The tracing function first displays the coordinates of a pointer that points to the graph on the graph.

At step S1d, the pointer for the trace function (trace pointer) is initialized. At this initialization, the trace pointer is set on the graph corresponding to Expression "a".

At step S2d, the X- and Y-axes are displayed. This is the same process as those carried out at steps S1c through S3c in FIG. 7.

At step S3d, the pointer is displayed on the position corresponding to the graph of the expression which is currently set.

At step S4d, an auxiliary pointer (axis pointer) is displayed in a position on the Y coordinate axis of the graph of interest to indicate the correspondence between the graph and the axis.

Figure 9:
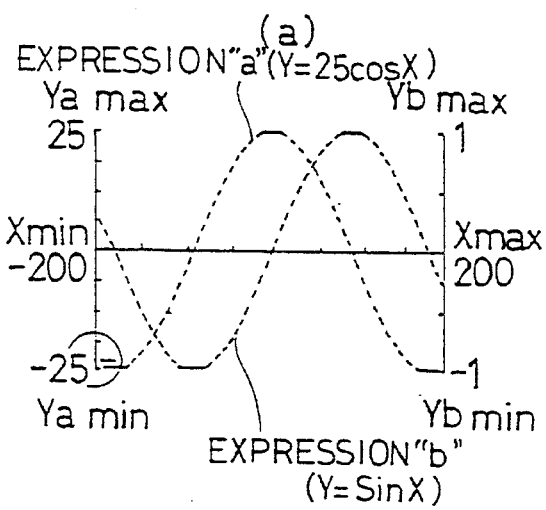
FIG. 9*a*–9*e* illustrate an example of the display of graphs during a tracing process according to the present invention.
Figure 9:
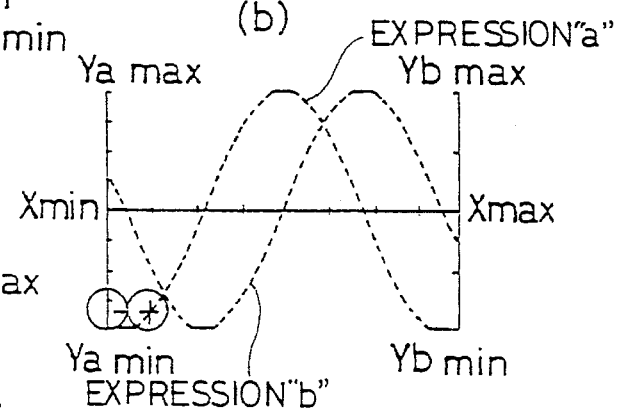
Figure 9:
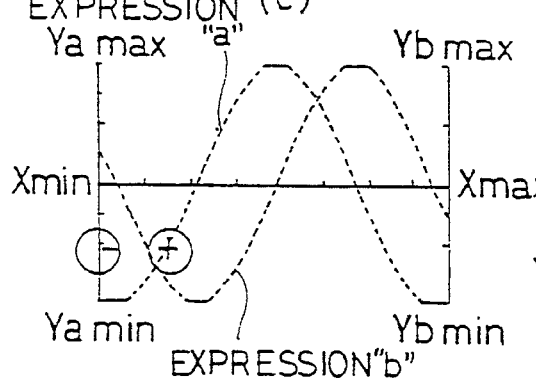
Figure 9:
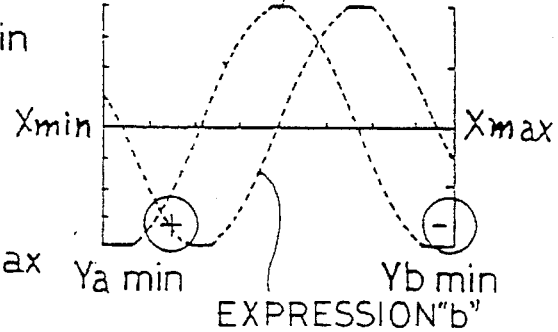
Figure 9:
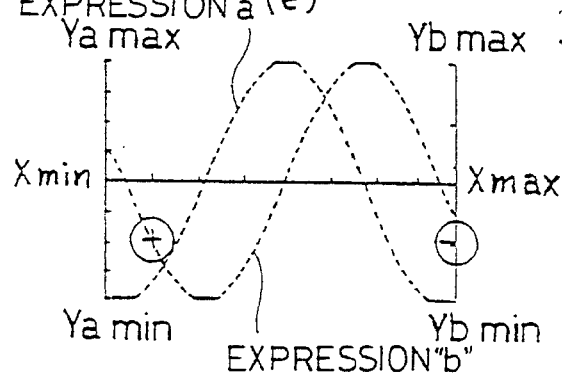

At step S5d, the process enters a standby state wherein it waits for a key input (see (a) in FIG. 9).

At step S6d, it is determined whether a cursor key has been input. If any other key has been input, the process proceeds to a process other than processes associated with the cursor.

At step S7d, it is determined which one has been input among the four keys to move the cursor to the left and right and upward and downward.

At step S8d, if the key to move the cursor to the left has been input, the trace pointer is moved to the left by decrementing the trace pointer by an amount corresponding to one pixel along the X-axis. When the key to move the cursor to the right has been input, the trace pointer is moved to the right by incrementing the trace pointer by an amount corresponding to one pixel along the X-axis.

At step S9d, when a key to move the cursor upward or downward has been input, the graph to be traced is switched. For example, when the key to move the cursor upward has been input, the cursor will move to a graph located above the graph which is currently traced. When the key to move the cursor downward has been input, the cursor will move to a graph located below the graph which is currently traced (see (c) and (d) in FIG. 9).

At step S10d, it is checked whether the pointer has moved out of the screen.

At step S11d, if the pointer has moved out of the screen, the graph is redrawn. That is, the steps are repeated starting with step S2d.

FIG. 9 illustrates an example of the display of graphs during a tracing process according to the present invention. FIG. 9 shows how the graph shown at (a) in FIG. 6 is traced. In FIG. 9, the circles indicate the pointer and auxiliary pointer on the graph.

The example at (a) in FIG. 9 illustrates the display that appears upon one push on the key to move the cursor to the right with the graph in the state as shown at (a) in FIG. 6 wherein the pointer (trace pointer) and the auxiliary pointer (axis pointer) are displayed. Further, the display is in the key input waiting state as shown at step S5d in FIG. 8.

The example at (b) in FIG. 9 illustrates of the display that appears when the key to move the cursor to the right is pushed eleven times. If the key to move the cursor to the right is pushed seven times thereafter, the display as shown in the example at (c) in FIG. 9 appears.

Thus, as the trace pointer on the graph is moved using the keys to move the cursor to the left and right, the axis pointer on the axis is moved. In other words, the axis pointer moves in correspondence to the values on the graph pointed by the trace pointer.

The example at (d) in FIG. 9 illustrates the display that appears when the key to move the cursor downward is pushed once. The push on the key to move the cursor downward causes the trace pointer to move to a point on the graph representing Expression "b" and, at the same time the axis on which the axis pointer appears is located on the right-hand side of the screen. The example shown at (e) in FIG. 9 is the display that appears when the key to move the cursor to the left is pushed six times thereafter.

Thus, as the trace pointer on the graph of the Expression "b" is moved by the keys to move the cursor to the left and right, the axis pointer on the axis is moved.

Although two axes having different display ranges are displayed on the right and left ends of the screen in the present embodiment, such axes may be displayed any positions regardless of the number of axes.

In addition, although correspondence between a graph and an axis is indicated by a pointer, such indication may be provided by changing the display density of the axis as a whole or by highlighting the effective range of the axis with bold solid line, narrow solid line, broken line, or the like.

Further, an arrangement may be made to allow the trace pointer and axis pointer to be arbitrarily set as a symbol or mark in advance.

Display of axes with the effects as described above can be performed not only in an orthogonal coordinates system but also in other coordinate systems such as polar coordinate system.

According to the present invention, graphs having different ranges is drawn in association with different axes on the same screen. As a result, the graphs can be displayed using the limited screen effectively, and this makes it easy to compare the shapes of the graphs.

Such comparison is effective for comparison of shapes and characteristics in graphs such as AC voltage/current graphs, Pareto graphs, and graphs having ranges which are greatly different from each other.

Further, in the tracing mode, the trace pointer is displayed on a graph and an axis pointer is also displayed on the axis associated with the graph. The axis pointer is moved in correspondence to the values on the graph pointed by the trace pointer. This makes transitions of values on the graph clearer and easier to read.

In addition, if symbols or marks to be displayed as the trace pointer and axis pointer are stored in advance, readability of transitions of values on the graph is further improved by such symbols or marks which can be arbitrarily set.

The tracing operation is simplified by the arrangement wherein the graph to be traced can be selected using the keys to move the cursor upward and downward and the trace pointer can be moved to the left and right using the keys to move the cursor to the left and right.

Various modifications to the present invention will become apparent to those skilled in the art from the foregoing description and accompanying drawings. Accordingly, the present invention is to be limited solely by the scope of the following claims.

What is claimed is:

1. An information processing apparatus having a function of displaying a plurality of graphs comprising display means for displaying graphs;

input means for at least inputting information such as information on mathematical expressions needed for drawing a plurality of graphs and information on graduation of a plurality of axes for respective graphs;

drawing data conversion means for converting the input information on a plurality of mathematical expressions into graph drawing data for drawing a plurality of graphs and for converting the information on graduation of a plurality of axes into axes drawing data to be used for graduating axes for respective graphs;

graph drawing means for drawing a plurality of graphs such that said graphs overlap each other about a common axis based on the graph drawing data and axes drawing data obtained as a result of the conversion and for drawing axes having different scales for respective graphs on the same screen; and pointing means for inputting pointing information to point a desired graph from among the plurality of graphs drawn on the same screen and to trace the graph;

said graph drawing means drawing a trace pointer on the relevant graph and drawing an axis pointer on the axis corresponding to the relevant graph in response to the pointing information received from said pointing means.

2. The information processing apparatus according to claim 1, further comprising a storage portion for storing symbols or marks to be displayed as said trace pointer and axis pointer wherein said trace pointer in advance wherein said input means has a function of arbitrarily setting said symbols or marks when tracing graphs.

3. The information processing apparatus according to claim 1, wherein said pointing means is constituted by a cursor key and when the cursor key points upward or downward, a graph to be traced is selected and when the cursor key points to the left or right said trace pointer is moved on the graph.

4. The information processing apparatus according to claim 1, wherein said display means includes areas for displaying a plurality of axes having different scales at least on the right and left ends of the screen.

5. The information processing apparatus according to claim 1, wherein said display means has a function of displaying a plurality of axes having different scales with different display densities in response to instructions input from said input means.

6. The information processing apparatus according to claim 1, wherein said display means has a function of displaying a plurality of axes having different scales using different types of lines such as a bold solid line, a narrow solid line, and a broken line in response to instructions input from said input means.

* * * * *